(12) United States Patent
Bader et al.

(10) Patent No.: US 8,591,620 B2
(45) Date of Patent: Nov. 26, 2013

(54) ARRANGEMENT WITH A COVER AND SELF-SUPPORTING FILTER ELEMENT

(75) Inventors: Robert Bader, Heidelberg (DE); Georges Sampaio, Sainte Foy les Lyon (FR)

(73) Assignee: Carl Freudenberg KG, Weinheim (DE)

( * ) Notice: Subject to any disclaimer, the term of this patent is extended or adjusted under 35 U.S.C. 154(b) by 209 days.

(21) Appl. No.: 13/161,970

(22) Filed: Jun. 16, 2011

(65) Prior Publication Data

US 2011/0308211 A1    Dec. 22, 2011

(30) Foreign Application Priority Data

Jun. 17, 2010 (DE) .......................... 10 2010 024 115

(51) Int. Cl.
*B01D 39/00* (2006.01)

(52) U.S. Cl.
USPC ................ 55/497; 55/385.3; 55/481; 55/493; 55/502; 55/506; 123/198 E

(58) Field of Classification Search
USPC ................ 55/497, 385.3, 481, 493, 502, 506; 123/198 E
See application file for complete search history.

(56) References Cited

U.S. PATENT DOCUMENTS

| | | | |
|---|---|---|---|
| 3,789,589 A * | 2/1974 | Delany et al. ................... | 55/481 |
| 6,598,580 B2 * | 7/2003 | Baumann et al. ......... | 123/198 E |
| 6,749,657 B2 | 6/2004 | Felber et al. | |

FOREIGN PATENT DOCUMENTS

| | | |
|---|---|---|
| DE | 101 11 318 | 10/2001 |
| DE | 101 23 969 | 11/2002 |
| DE | 20 2005 013 646 | 11/2005 |
| DE | 20 2008 010 474 | 12/2009 |
| EP | 1 172 240 | 1/2002 |

* cited by examiner

*Primary Examiner* — Robert Clemente
*Assistant Examiner* — Karla Hawkins
(74) *Attorney, Agent, or Firm* — Grossman, Tucker, Perreault & Pfleger, PLLC

(57) ABSTRACT

An arrangement consisting of a cover and a filter element, wherein the filter element has a corrugated bellows with adjacent pleat ridges, wherein the corrugated bellows is hemmed by edge strips, wherein the filter element bears against one abutment side of the cover forming a seal and wherein the filter element is fixed with one side to the abutment side and in that context projects self-supporting from the abutment side of the cover, is in view of the objective to design an arrangement of the type mentioned at the outset and develop it further so that following cost-effective production, a reliable attachment of a filter element on the cover is assured, characterized in that gripping means are arranged on the abutment side which engage around an edge strip on both sides, which bears against the abutment side.

13 Claims, 3 Drawing Sheets

ARRANGEMENT WITH A COVER AND SELF-SUPPORTING FILTER ELEMENT

CROSS REFERENCE TO RELATED APPLICATIONS

This application claims priority to German Patent Application No. 10 2010 024 115.6-27 filed on Jun. 17, 2010, the disclosure of which is incorporated by reference herein in its entirety.

FIELD OF THE INVENTION

The invention relates to an arrangement with a cover and a self-supporting filter element consisting of a cover and a filter element, wherein the filter element has a corrugated bellows with adjacent pleat ridges, wherein the corrugated bellows is hemmed by edge strips, wherein the filter element bears against one abutment side of the cover forming a seal and wherein the filter element is fixed with one side to the abutment side and in that context projects self-supporting from the abutment side of the cover, wherein gripping means are arranged on the abutment side, which engage around both sides of an edge strip, which bears against the abutment side.

BACKGROUND

A cover has been described previously in DE 20 2008 010 474 U1 from which mounting elements for barbs project.

U.S. Pat. No. 3,789,589 discloses a filter element on which a reinforcing strip is wrapped around the last pleat walls on both sides, wherein the last pleat walls along with the reinforcing strip are pressed into a U-shaped groove.

DE 101 23 969 C1 discloses an arrangement with a cover from which guide rails project orthogonally in the direction of the filter element. The guide rails run parallel to the longitudinal sides of the filter element which are hemmed with the edge strips. For this purpose, the pleat ridges are aligned orthogonally to the longitudinal sides. A blade that also projects from the cover engages into a pleat of the corrugated bellows. The pleat ridges run parallel to the abutment side of the cover.

A disadvantage of the generic arrangement is that the filter element can cause unpleasant noise because the filter element mounted in the guide rails of the cover can wobble. In the worst case, the filter element can even drop out of the cover and block evaporators and/or blowers in automobiles. A loose filter element can moreover cause leakages.

SUMMARY

The object of the invention is therefore to design and develop an arrangement of the type mentioned at the outset such as to ensure that the filter element can be reliably attached to the cover, following cost-effective production.

The present invention relates to an arrangement with a cover and a self-supporting filter element consisting of a cover and a filter element, wherein the filter element has a corrugated bellows with adjacent pleat ridges, wherein the corrugated bellows is hemmed by edge strips, wherein the filter element bears against one abutment side of the cover forming a seal and wherein the filter element is fixed with one side to the abutment side and in that context projects self-supporting from the abutment side of the cover, wherein gripping means are arranged on the abutment side, which engage around both sides of an edge strip, which bears against the abutment side.

The invention teaches that gripping means are arranged on the abutment side which encompasses an edge strip on both sides which bears flat against the abutment side and is aligned parallel to it. With this specific design it is possible to use an edge strip that is available anyway on most of the commercially available filter elements, in order to fix the filter element. At the same time it was specifically discovered that the filter element can be connected with the cover by a sliding procedure. It was also discovered that the arrangement must not have any guide elements which project from the cover and/or the abutment side in an orthogonal direction.

It is therefore possible to use cost-effective filter elements made of nonwoven fabric or textile materials without having to design reinforcing plastic elements on the cover. The invention teaches that it was specifically found that the inherent stability of a filter element with corrugated bellows made of nonwoven fabric and glued or welded rigid or flexible edge strips is sufficient to insert it into the duct of a filter housing. Surprisingly, the filter element does not bend such that it can no longer be inserted into a duct. The filter element rather projects from the cover with high rigidity such that a fitter can insert the filter element into a duct of a filter housing simply by holding the cover. For this purpose, the filter element can be engaged into rails inside of the duct, surprisingly without problems. After inserting the filter element into the duct, the cover can close its opening forming a seal. By dispensing with the need for a frame that is molded to the cover to hold the filter element, it becomes possible to manufacture an arrangement cost-effectively. By this arrangement, it is assured that a filter element is reliably attached to the cover.

The problem mentioned at the outset is therefore solved.

The gripping means and the cover can be designed in one piece, wherein the gripping means are designed such that the edge strip can be inserted along its longitudinal axis or longitudinal extension aligned parallel to the abutment side laterally such that it bears flat against the abutment side after the insertion. By this specific design, previously known filter elements, which are provided with an edge strip, can be combined easily with the cover as one structural unit by an insertion process.

The filter element could be connected with the abutment side by adhesive force. This ensures a secure attachment of the filter element onto the cover. In this context, it is conceivable that the filter element is glued or welded to the abutment side.

In view of this background, the filter element could be glued exclusively to the abutment side. An adhesive permits rapid and secure attachment of the filter element onto the cover. In this context, it is also conceivable that the filter element apart from an adhesive is additionally held by gripping means.

The filter element could bear against the abutment side with an edge strip, wherein the pleat ridges project orthogonally from this edge strip. This specific design is an ingenious solution to prevent bending the filter element. The inherent stiffness of the corrugated bellows in the transverse direction, i.e. in the direction of alignment of the pleat ridges, is utilized to attach the filter element to the abutment side so that it is self-supporting.

In view of this background, the edge strip could project beyond the pleat ridges preferably on both sides, wherein the projection which protrudes preferably on both sides of the pleat ridges can be inserted into the gripping means. By this specific design, a filter element can be inserted into the cover such that the edge strip and the abutment side are aligned parallel to each other and are in alignment with each other.

The gripping means can include two-leg elements with an L-shaped cross section, the first leg of which is fixed on the abutment side and the second leg of which is aligned orthogonally to the first leg to engage behind the edge strip and press it against the abutment side. By this specific design, the edge strip is fixed free of tilt onto the abutment side on the one hand, and on the other, is compressed at the same time, since it will be grouted in a groove between the second leg and the abutment side. The two-leg elements are preferably arranged on opposite edges of the abutment side. For this purpose, the elements are arranged in opposing and offset positions relative to one another.

The edge strip could consist of a compressible or deformable material which establishes that the filter element bears against the abutment side as a seal by compression or deformation. A deformable material can realize a pressfit and a sealing fit. In view of this background, it is conceivable that the edge strips consist of nonwoven fabric, foamed material, or textile materials.

A limit stop element could project from the abutment side. The limit stop element prevents a filter element from being pushed beyond the limit stop. The limit stop element is preferably arranged on an edge side of the abutment side.

The cover could have a bracket facing away from the abutment side, wherein a grip element is assigned to the bracket. A bracket can close an opening of a filter housing. This arrangement can therefore be inserted as a preassembled unit into the duct of a filter housing and to close it as a tight seal. For this purpose, a fitter can pick up the unit on the grip element.

A cover, comprising a base body with an abutment side and a bracket that is facing away from the abutment side for closing a filter housing, wherein gripping means are arranged on the abutment side, will also solve the problem mentioned at the outset. Such cover can also be used in an arrangement of the type described previously.

The filter element described herein is particularly suitable for use as a filter for the passenger compartment of automobiles, since it has a high filter efficiency in terms of optimized installation space. The filter element described here is suitable not only for particle filtration, but also for the absorption of unpleasant odors. The filter element described here is suitable for modern automobiles in which only very tight installation space is available to accommodate filter elements.

Now there are various possibilities to design and further develop the teaching of the present invention advantageously. For this purpose, reference is made to the subordinate Claims on the one hand, and on the other to the subsequent explanations of a preferred embodiment of the invention by means of the drawing.

In connection with the explanation of the preferred embodiment of the invention by means of the drawing, also generally preferred embodiments and further developments of the teaching will be discussed.

DETAILED DESCRIPTION

Figure 1:
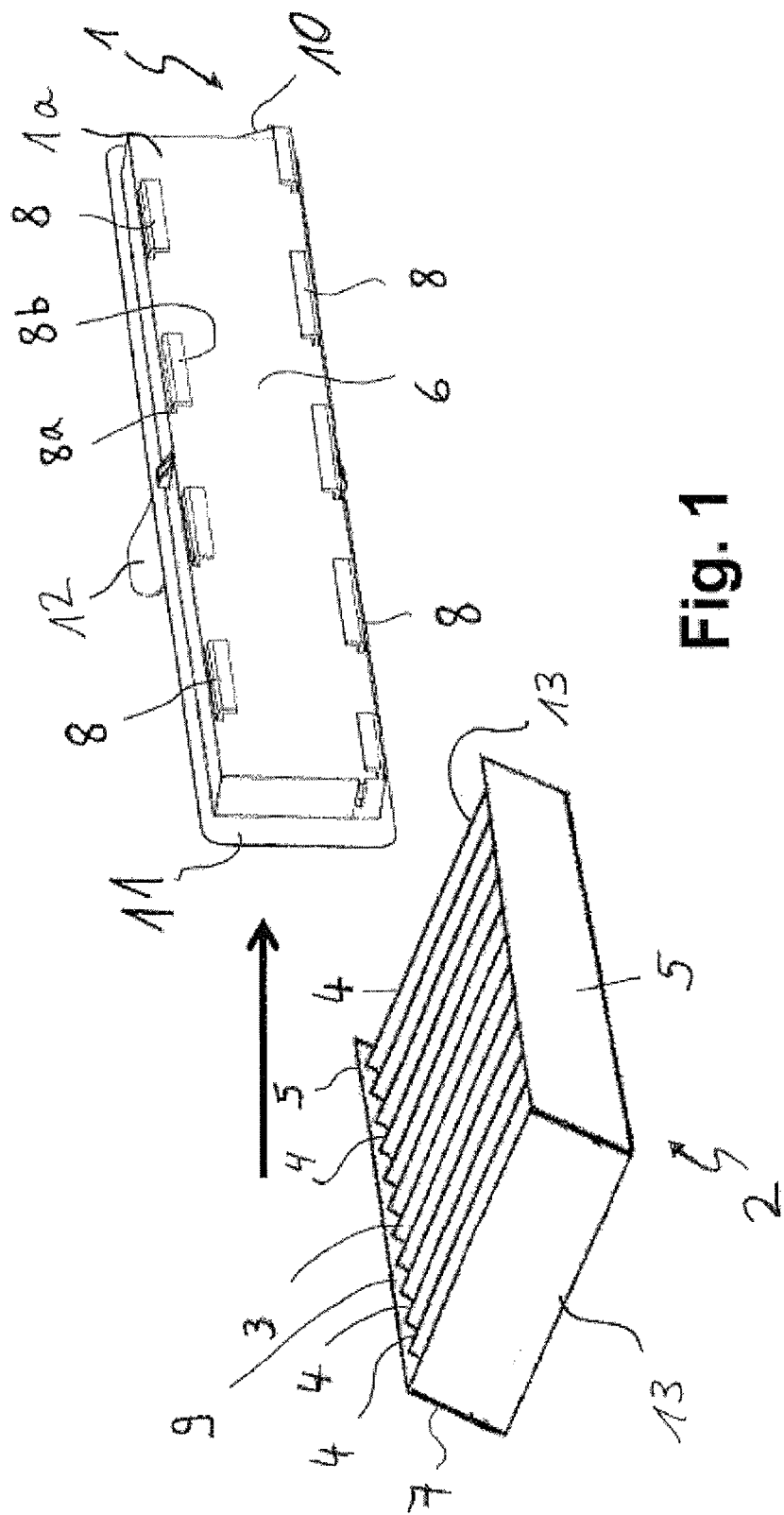
FIG. 1 is a filter element which is inserted into a cover so that it can project therefrom self-supporting.

FIG. 1 shows the assembly of an arrangement, consisting of a cover 1 and a filter element 2, wherein the filter element 2 has a corrugated bellows 3 with adjacent pleat ridges 4, wherein the corrugated bellows 3 is hemmed by edge strips 5, wherein the filter element 2 bears against one abutment side 6 of the cover 1 as a tight seal and wherein one side 7 of the filter element 2 is fixed onto the abutment side 1 and in this context projects self-supporting from the abutment side 6 of the cover 1.

Gripping means 8 are arranged on the abutment side 6 which engage around both sides of an edge strip 5 which will bear against the abutment side 6.

The gripping means 8 and the cover 1 are designed as one piece. The gripping means 8 are designed such that the edge strip 5 can be inserted along its longitudinal axis or longitudinal extension aligned parallel to the abutment side 6 (direction of arrow) laterally into the gripping means 8 such that it bears flat against the abutment side 6 following the insertion.

In this context, the filter element 2 can be glued to the abutment side 6. The filter element 2 bears against the abutment side 6 with an edge strip 5, wherein the pleat ridges 4 project orthogonally from this edge strip 5.

Gripping means 8 are arranged on the abutment side 6 which engage around both sides of the edge strip 5 which bears against the abutment side 6. The edge strip 5 projects beyond the pleat ridges 4, wherein a projection 9 which projects beyond the pleat ridges 4 can be inserted into the gripping means 8.

Figure 2:
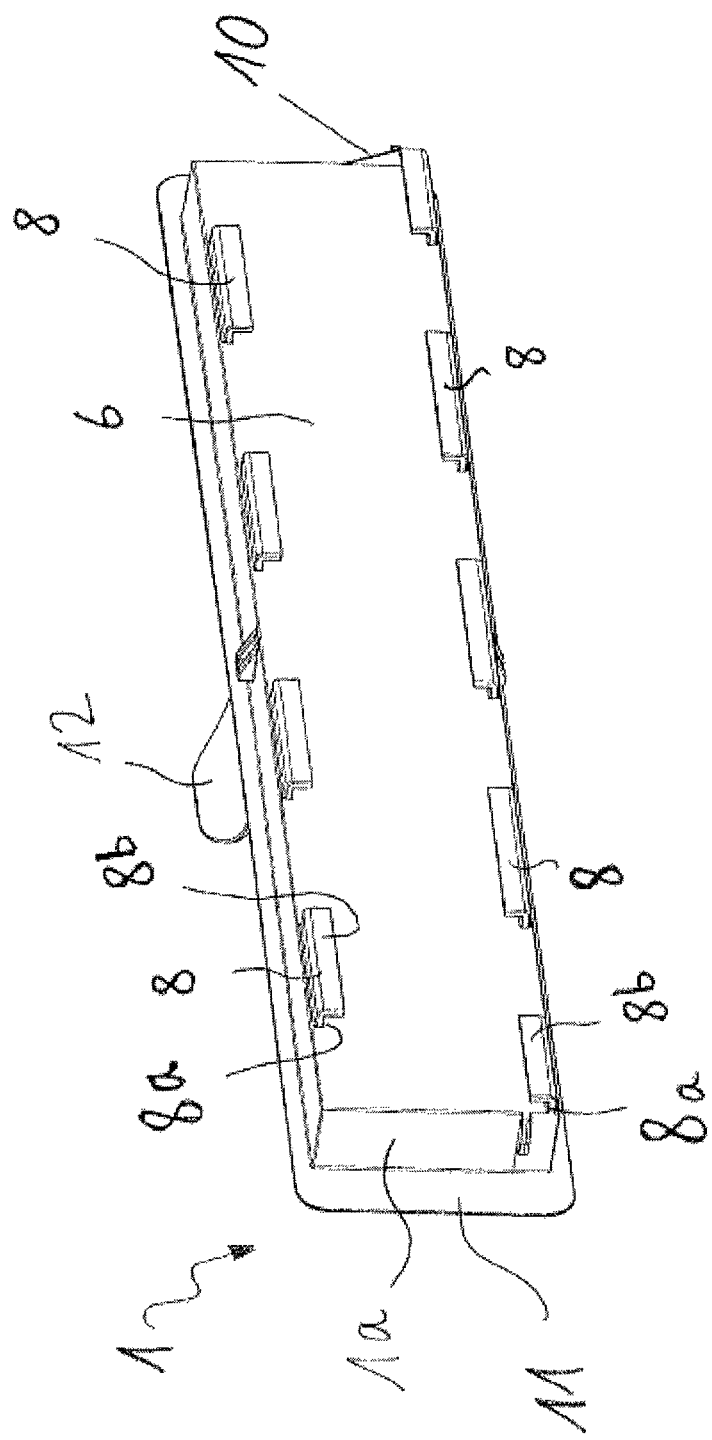
FIG. 2 is the cover pursuant to FIG. 1

FIG. 2 shows that the gripping means 8 include two-leg elements with an L-shaped cross section, the first leg 8a of which is fixed to the abutment side 6 and the second leg 8b of which is aligned orthogonally to the first leg 8a to engage behind the edge strip 5 and press it against the abutment side 6.

The edge strip 5 consists of a compressible or deformable material which establishes that the filter element 2 bears against the abutment side 6 as a seal by compression or deformation. The edge strip 5 specifically consists of a nonwoven fabric and the corrugated bellows 3 consists of a nonwoven fabric. The edge strips 5 can be welded or glued to the corrugated bellows 3. A limit stop element 10 projects from one side of the abutment side 6. The limit stop element 10 is shaped triangular and is arranged on an edge side, i.e. on a transverse side, of the abutment side 6. The gripping means 8 are arranged in opposing and offset positions relative to one another respectively on the longitudinal sides of the abutment side 6.

The cover 1 has a bracket 11 facing away from the abutment side 6, wherein a grip element 12 is assigned to the bracket 11. The cover 1 is produced from a plastic material. The cover 1 can be loosened by the gripping means 8 from the filter element 2 non-destructively for reuse.

Each of the last end pleat 13 of the corrugated bellows 3 can be curved convex toward the outside, in order to ensure that it bears tightly against a wall of the filter housing. It is also conceivable, however, that rigid or flexible edge strips are provided instead of curved end pleats 13, which are provided with sealants.

Sealants can also be assigned to the edge strip 5, which is facing away from the abutment side 6, to bear against the base of the duct forming a seal. Preferably, a projecting V-shaped cover strap can be arranged here.

FIG. 2 shows a cover 1 for use in an arrangement pursuant to FIG. 1, comprising a base body 1a with an abutment side 6 and a bracket 11 facing away from the abutment side 6 for closing a filter housing (not shown), wherein gripping means 8 are arranged on the abutment side 6. Peripheral sealants (not shown) can be assigned to the bracket 11.

Figure 3:
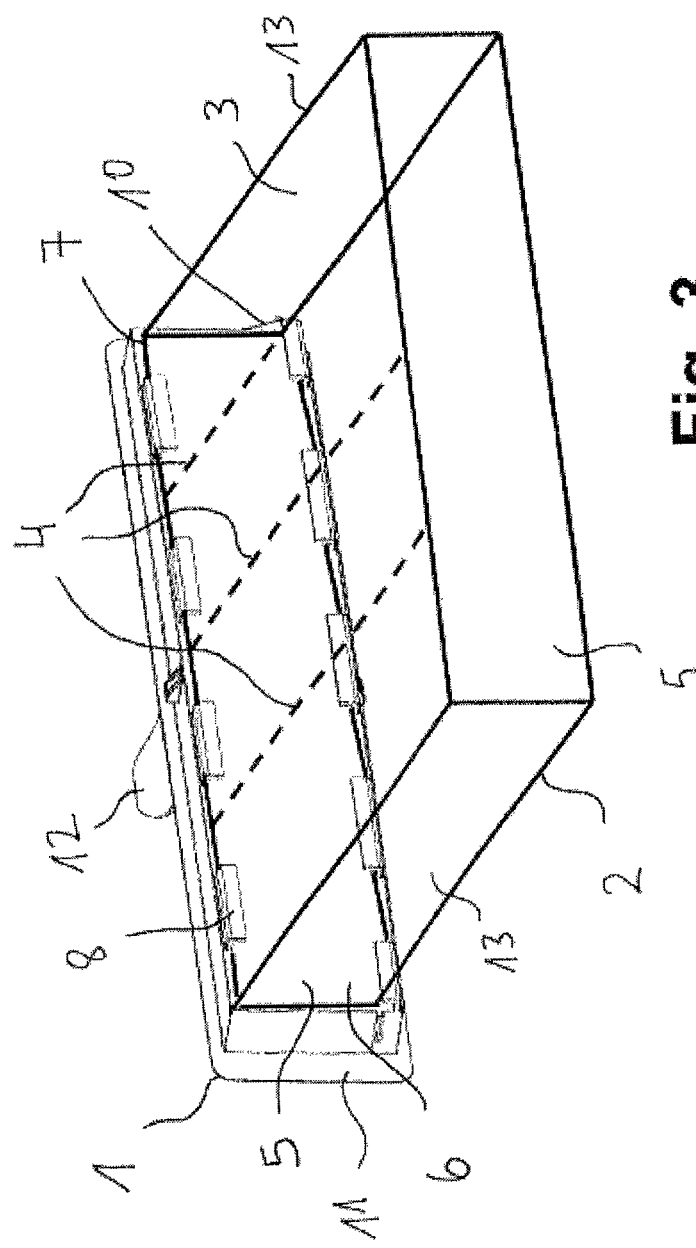
FIG. 3 is a schematic representation of the assembled arrangement pursuant to FIG. 1.

FIG. 3 shows the finished assembly of an arrangement pursuant to FIG. 1, consisting of a cover 1 and a filter element 2, wherein the filter element 2 has a corrugated bellows 3 with adjacent pleat ridges 4, wherein the corrugated bellows 3 is hemmed by edge strips 5 and wherein the filter element 2 bears against one abutment side 6 of the cover 1 as a tight seal. The filter element 2 is fixed on the abutment side 6 with one side 7 and in this context projects self-supporting from the abutment side 6 of the cover 1. For reasons of clarity, the filter element 2 is illustrated as being transparent.

Gripping means 8 are arranged on the abutment side 6 which engage around both sides of an edge strip 5 which bears against the abutment side 6.

The gripping means 8 and the cover 1 are designed in one piece, wherein the gripping means 8 are designed such that the edge strip 5 can be inserted along its longitudinal axis or longitudinal extension aligned parallel to the abutment side 6 laterally into the gripping means such that it bears flat against the abutment side 6 after the insertion.

With respect to further advantageous embodiments and further developments of the teaching of the invention, reference is made to the general part of the description on the one hand, and to the enclosed Claims on the other.

Finally, it should be particularly emphasized that the previously selected embodiment merely serves for the discussion of the teaching as taught by the invention, and that it does not limit it to this embodiment, however.

What is claimed is:

1. An arrangement comprising:
   a cover including
      an abutment side, and
      gripping means arranged on said abutment side; and
   a filter element fixed with one side to the abutment side and projects self-supporting from the abutment side, wherein the filter element has
      a corrugated bellows with adjacent pleat ridges,
      wherein the corrugated bellows is hemmed by edge strips,
      wherein one of said edges strips of the filter element bears against the abutment side of the cover forming a seal and the pleat ridges extend orthogonally from the edge strip bearing against said one abutment side, and
      wherein said gripping means engage around both sides of said edge strip, which bears against the abutment side.

2. The arrangement according to claim 1, wherein the gripping means and the cover are one piece, wherein the gripping means are such that the edge strip aligned parallel to the abutment side along its longitudinal axis can be inserted laterally into the gripping means such that it bears flat against the abutment side after the insertion.

3. The arrangement according to claim 1, wherein the filter element is connected with the abutment side by adhesive force.

4. The arrangement according to claim 1, wherein the edge strip projects beyond the pleat ridges, wherein a projection projecting beyond the pleat ridges can be inserted into the gripping means.

5. The arrangement according to claim 1, wherein the gripping means include two-leg elements with an L-shaped cross section, which are fixed with a first leg to the abutment side and with a second leg which is aligned orthogonally to the first leg engage behind the edge strip and press it against the abutment side.

6. The arrangement according to claim 1, wherein the edge strip comprises a compressible or deformable material which establishes that the filter element bears against the abutment side as a seal by compression or deformation.

7. The arrangement according to claim 1, wherein a limit stop element projects from one side of the abutment side.

8. The arrangement according to claim 1, wherein the cover has a bracket facing away from the abutment side, wherein a grip element is assigned to the bracket.

9. A cover for use in an arrangement according to claim 1, comprising a base body with an abutment side and a bracket facing away from the abutment side for closing a filter housing, wherein gripping means are arranged on the abutment side.

10. The arrangement of claim 1, wherein said edge strips consist of a nonwoven fabric.

11. The arrangement of claim 10, wherein said corrugated bellows consist of a nonwoven fabric.

12. The arrangement of claim 7, wherein said limit stop element projects transversely from an edge side of said abutment side preventing said filter from being pushed beyond said limit stop and said edge side of said abutment side.

13. The arrangement of claim 1, wherein said bellows includes at least one last end pleat which is curved convex.

* * * * *